(12) United States Patent
Christensen et al.

(10) Patent No.: US 9,364,896 B2
(45) Date of Patent: Jun. 14, 2016

(54) FABRICATION OF HYBRID SOLID-POROUS MEDICAL IMPLANTABLE DEVICES WITH ELECTRON BEAM MELTING TECHNOLOGY

(71) Applicant: Medical Modeling Inc., Golden, CO (US)

(72) Inventors: Andrew M. Christensen, Littleton, CO (US); Ryan S. Kircher, Evergreen, CO (US)

(73) Assignee: Medical Modeling Inc., Golden, CO (US)

( * ) Notice: Subject to any disclaimer, the term of this patent is extended or adjusted under 35 U.S.C. 154(b) by 160 days.

(21) Appl. No.: 13/762,351

(22) Filed: Feb. 7, 2013

(65) Prior Publication Data

US 2013/0199748 A1    Aug. 8, 2013

Related U.S. Application Data

(60) Provisional application No. 61/596,195, filed on Feb. 7, 2012.

(51) Int. Cl.
*B22D 25/02* (2006.01)
*B22F 3/105* (2006.01)
(Continued)

(52) U.S. Cl.
CPC .............. *B22D 25/02* (2013.01); *B22F 3/1055* (2013.01); *B22F 3/11* (2013.01); *B29C 67/0077* (2013.01); *C22C 14/00* (2013.01); *Y02P 10/295* (2015.11)

(58) Field of Classification Search
CPC .................................................... B22F 3/1055
USPC ............................................................ 419/2
See application file for complete search history.

(56) References Cited

U.S. PATENT DOCUMENTS

| 14,403 A | 3/1856 | Brown et al. |
|---|---|---|
| 222,687 A | 12/1879 | Fresco |

(Continued)

FOREIGN PATENT DOCUMENTS

| CA | 2295896 | 7/2007 |
|---|---|---|
| EP | 0178650 | 4/1986 |

(Continued)

OTHER PUBLICATIONS

C.K. Chua et al. Development of a Tissue Engineering Scaffold Structure Library for Rapid Prototyping. Pads 1 and 2, International Journal of Advanced Manufacturing Technology, (2003) vol. 21, pp. 291-312.*

(Continued)

*Primary Examiner* — Jessee Roe
*Assistant Examiner* — Christopher Kessler
(74) *Attorney, Agent, or Firm* — Hamilton, DeSanctis & Cha LLP (57) ABSTRACT

Systems and methods for fabrication of implantable medical devices using an Electron Beam Melting (EBM) manufacturing process are provided. According to one embodiment, an EBM manufacturing system is caused to perform a fabrication process that results in an implantable medical device of unitary construction having a solid volume and a porous volume. A layer of metal powder is spread across a build platform of the EBM manufacturing system. Portions of the layer of metal powder are selectively heated in accordance each portion's association with the solid volume or the porous volume by scanning the layer of metal powder with an electron beam of the EBM manufacturing system and adjusting a power of the electron beam and a speed of said scanning. The build platform is lowered based on a predetermined layer thickness and the process of continues on a layer-by-layer basis until the implantable medical device is completed.

14 Claims, 12 Drawing Sheets

(51) Int. Cl.
  *B22F 3/11* (2006.01)
  *B29C 67/00* (2006.01)
  *C22C 14/00* (2006.01)

(56) References Cited

U.S. PATENT DOCUMENTS

| | | |
|---|---|---|
| 2,373,769 A | 4/1945 | Macy |
| 3,520,099 A | 7/1970 | Mattes |
| 3,556,918 A | 1/1971 | Lemelson |
| 3,605,123 A | 9/1971 | Pratt et al. |
| 3,806,961 A | 4/1974 | Muller |
| 3,816,855 A | 6/1974 | Saleh |
| 3,826,054 A | 7/1974 | Culpepper, Jr. |
| 4,047,349 A | 9/1977 | Aguilar, Jr. |
| 4,085,466 A | 4/1978 | Goodfellow et al. |
| 4,154,040 A | 5/1979 | Pace |
| 4,164,794 A | 8/1979 | Spector et al. |
| 4,202,055 A | 5/1980 | Reiner et al. |
| 4,218,494 A | 8/1980 | Belmondo et al. |
| 4,305,340 A | 12/1981 | Iwaki et al. |
| 4,344,193 A | 8/1982 | Kenny |
| 4,385,404 A | 5/1983 | Sully et al. |
| 4,444,818 A | 4/1984 | Tominaga et al. |
| 4,502,161 A | 3/1985 | Wall |
| 4,513,045 A | 4/1985 | Bondoc et al. |
| 4,543,158 A | 9/1985 | Bondoc et al. |
| 4,636,219 A | 1/1987 | Pratt et al. |
| 4,644,942 A | 2/1987 | Sump |
| 4,673,408 A | 6/1987 | Grobbelaar |
| 4,714,473 A | 12/1987 | Bloebaum |
| 4,714,474 A | 12/1987 | Brooks, Jr. et al. |
| 4,719,908 A | 1/1988 | Averill et al. |
| 4,766,029 A | 8/1988 | Brock et al. |
| 4,863,538 A | 9/1989 | Deckard |
| 4,944,817 A | 7/1990 | Bourell et al. |
| 4,961,154 A | 10/1990 | Pomerantz et al. |
| 4,969,302 A | 11/1990 | Coggan et al. |
| 4,969,907 A | 11/1990 | Koch et al. |
| 4,990,163 A | 2/1991 | Ducheyne et al. |
| 5,004,476 A | 4/1991 | Cook |
| 5,017,753 A | 5/1991 | Deckard |
| 5,024,670 A | 6/1991 | Smith et al. |
| 5,031,120 A | 7/1991 | Pomerantz et al. |
| 5,034,186 A | 7/1991 | Shimamune et al. |
| 5,053,090 A | 10/1991 | Beaman et al. |
| 5,067,964 A | 11/1991 | Richmond et al. |
| 5,076,869 A | 12/1991 | Bourell et al. |
| 5,080,674 A | 1/1992 | Jacobs et al. |
| 5,090,174 A | 2/1992 | Fragale |
| 5,108,432 A | 4/1992 | Gustavson |
| 5,108,441 A | 4/1992 | McDowell |
| 5,147,402 A | 9/1992 | Bohler et al. |
| 5,155,324 A | 10/1992 | Deckard et al. |
| 5,158,574 A | 10/1992 | Stone |
| 5,171,282 A | 12/1992 | Pequignot |
| 5,176,710 A | 1/1993 | Hahn et al. |
| 5,192,328 A | 3/1993 | Winters |
| 5,219,362 A | 6/1993 | Tuke et al. |
| 5,282,861 A | 2/1994 | Kaplan |
| 5,282,870 A | 2/1994 | Moser et al. |
| 5,287,435 A | 2/1994 | Cohen et al. |
| 5,314,478 A | 5/1994 | Oka et al. |
| 5,323,954 A | 6/1994 | Shetty et al. |
| 5,336,518 A | 8/1994 | Narayanan et al. |
| 5,356,433 A | 10/1994 | Rowland et al. |
| 5,358,529 A | 10/1994 | Davidson |
| 5,368,602 A | 11/1994 | de la Torre |
| 5,386,500 A | 1/1995 | Pomerantz et al. |
| 5,398,193 A | 3/1995 | Deangelis |
| 5,425,210 A | 6/1995 | Zafir |
| 5,443,510 A | 8/1995 | Shelly et al. |
| 5,443,518 A | 8/1995 | Insall |
| 5,461,839 A | 10/1995 | Beck |
| 5,486,599 A | 1/1996 | Saunders et al. |
| 5,490,962 A | 2/1996 | Cima et al. |
| 5,496,372 A | 3/1996 | Hamamoto et al. |
| 5,504,300 A | 4/1996 | Devanathan et al. |
| 5,514,183 A | 5/1996 | Epstein et al. |
| 5,526,627 A | 6/1996 | Beck |
| 5,549,700 A | 8/1996 | Graham et al. |
| 5,571,185 A | 11/1996 | Schug |
| 5,571,196 A | 11/1996 | Stein |
| 5,609,646 A | 3/1997 | Field et al. |
| 5,616,294 A | 4/1997 | Deckard |
| 5,624,463 A | 4/1997 | Stone et al. |
| 5,632,745 A | 5/1997 | Schwartz |
| 5,640,667 A | 6/1997 | Freitag et al. |
| 5,648,450 A | 7/1997 | Dickens, Jr. et al. |
| 5,681,354 A | 10/1997 | Eckhoff |
| 5,702,448 A | 12/1997 | Buechel et al. |
| 5,728,162 A | 3/1998 | Eckhoff |
| 5,729,946 A | 3/1998 | Beck |
| 5,735,903 A | 4/1998 | Li et al. |
| 5,749,874 A | 5/1998 | Schwartz |
| 5,769,899 A | 6/1998 | Schwartz et al. |
| 5,773,789 A | 6/1998 | Devanathan et al. |
| 5,776,201 A | 7/1998 | Colleran et al. |
| 5,782,908 A | 7/1998 | Cahalan et al. |
| 5,795,353 A | 8/1998 | Felt |
| 5,824,098 A | 10/1998 | Stein |
| 5,824,102 A | 10/1998 | Buscayret |
| 5,839,247 A | 11/1998 | Beck |
| 5,857,303 A | 1/1999 | Beck et al. |
| 5,866,113 A | 2/1999 | Hendriks et al. |
| 5,879,387 A | 3/1999 | Jones et al. |
| 5,879,398 A | 3/1999 | Swarts et al. |
| 5,928,285 A | 7/1999 | Bigliani et al. |
| 5,973,222 A | 10/1999 | Devanathan et al. |
| 5,987,838 A | 11/1999 | Beck |
| 5,989,472 A | 11/1999 | Ashby et al. |
| 6,013,855 A | 1/2000 | McPherson et al. |
| 6,046,426 A | 4/2000 | Jeantette et al. |
| 6,049,054 A | 4/2000 | Panchison et al. |
| 6,087,553 A | 7/2000 | Cohen et al. |
| 6,096,043 A | 8/2000 | Techiera et al. |
| 6,128,866 A | 10/2000 | Wearne |
| 6,132,468 A | 10/2000 | Mansmann |
| 6,139,585 A | 10/2000 | Li |
| 6,164,032 A | 12/2000 | Beck |
| 6,171,340 B1 | 1/2001 | McDowell |
| 6,190,407 B1 | 2/2001 | Ogle et al. |
| 6,206,924 B1 | 3/2001 | Timm |
| 6,206,927 B1 | 3/2001 | Fell et al. |
| 6,215,093 B1 | 4/2001 | Meiners et al. |
| 6,248,131 B1 | 6/2001 | Felt et al. |
| 6,251,143 B1 | 6/2001 | Schwartz et al. |
| 6,261,322 B1 | 7/2001 | Despres, III et al. |
| 6,280,478 B1 | 8/2001 | Richter et al. |
| 6,283,997 B1 | 9/2001 | Garg et al. |
| 6,299,645 B1 | 10/2001 | Ogden |
| 6,344,061 B1 | 2/2002 | Leitao et al. |
| 6,355,086 B2 | 3/2002 | Brown et al. |
| 6,370,382 B1 | 4/2002 | Kang et al. |
| 6,371,958 B1 | 4/2002 | Overaker |
| 6,385,585 B1 | 5/2002 | Jonsson et al. |
| 6,395,327 B1 | 5/2002 | Shelly |
| 6,406,497 B2 | 6/2002 | Takei |
| 6,415,574 B2 | 7/2002 | Beck |
| 6,454,811 B1 | 9/2002 | Sherwood et al. |
| 6,476,343 B2 | 11/2002 | Keicher et al. |
| 6,482,209 B1 | 11/2002 | Engh et al. |
| 6,494,914 B2 | 12/2002 | Brown et al. |
| 6,520,996 B1 | 2/2003 | Manasas et al. |
| 6,530,951 B1 | 3/2003 | Bales et al. |
| 6,551,608 B2 | 4/2003 | Yao |
| 6,558,421 B1 | 5/2003 | Fell et al. |
| 6,582,715 B1 | 6/2003 | Barry et al. |
| 6,589,283 B1 | 7/2003 | Metzger et al. |
| 6,592,598 B2 | 7/2003 | Vibe-Hansen et al. |
| 6,599,301 B2 | 7/2003 | Vibe-Hansen et al. |
| 6,610,067 B2 | 8/2003 | Tallarida et al. |
| 6,626,945 B2 | 9/2003 | Simon et al. |
| 6,632,246 B1 | 10/2003 | Simon et al. |
| 6,652,246 B1 | 11/2003 | Lin et al. |

(56) References Cited

U.S. PATENT DOCUMENTS

| | | |
|---|---|---|
| 6,652,587 B2 | 11/2003 | Felt et al. |
| 6,679,917 B2 | 1/2004 | Ek |
| 6,682,567 B1 | 1/2004 | Schroeder |
| 6,686,437 B2 | 2/2004 | Buchman et al. |
| 6,699,252 B2 | 3/2004 | Farr, II et al. |
| 6,709,462 B2 | 3/2004 | Hanssen |
| 6,712,822 B2 | 3/2004 | Re et al. |
| 6,712,856 B1 | 3/2004 | Carignan et al. |
| 6,716,957 B2 | 4/2004 | Tunc |
| 6,743,232 B2 | 6/2004 | Overaker et al. |
| 6,770,099 B2 | 8/2004 | Andriacchi et al. |
| 6,846,329 B2 | 1/2005 | McMinn |
| 6,850,125 B2 | 2/2005 | Norman et al. |
| 6,852,125 B2 | 2/2005 | Simon et al. |
| 6,855,165 B2 | 2/2005 | Fell et al. |
| 6,863,689 B2 | 3/2005 | Ralph et al. |
| 6,866,684 B2 | 3/2005 | Fell et al. |
| 6,893,463 B2 | 5/2005 | Fell et al. |
| 6,911,044 B2 | 6/2005 | Fell et al. |
| 6,916,341 B2 | 7/2005 | Rolston |
| 6,921,264 B2 | 7/2005 | Mayer et al. |
| 6,923,831 B2 | 8/2005 | Fell et al. |
| 6,932,610 B2 | 8/2005 | Ono et al. |
| 7,168,283 B2 | 1/2007 | Van Note et al. |
| 7,494,507 B2 | 2/2009 | Dixon et al. |
| 7,537,664 B2 | 5/2009 | O'neill et al. |
| 7,674,517 B2 | 3/2010 | Ramsey et al. |
| 2001/0014403 A1 | 8/2001 | Brown et al. |
| 2002/0010512 A1 | 1/2002 | Takei |
| 2002/0015654 A1 | 2/2002 | Das et al. |
| 2002/0016635 A1 | 2/2002 | Despres et al. |
| 2002/0127328 A1 | 9/2002 | Shelly |
| 2002/0130112 A1 | 9/2002 | Manasas et al. |
| 2002/0151983 A1 | 10/2002 | Shelly |
| 2002/0173855 A1 | 11/2002 | Mansmann |
| 2002/0198528 A1 | 12/2002 | Engh et al. |
| 2003/0032351 A1 | 2/2003 | Horner et al. |
| 2003/0033018 A1 | 2/2003 | Merchant |
| 2003/0045941 A1 | 3/2003 | Lewallen |
| 2003/0055500 A1 | 3/2003 | Fell et al. |
| 2003/0055501 A1 | 3/2003 | Fell et al. |
| 2003/0060882 A1 | 3/2003 | Fell et al. |
| 2003/0060883 A1 | 3/2003 | Fell et al. |
| 2003/0060884 A1 | 3/2003 | Fell et al. |
| 2003/0060885 A1 | 3/2003 | Fell et al. |
| 2003/0060888 A1 | 3/2003 | Fell et al. |
| 2003/0069638 A1 | 4/2003 | Barlow et al. |
| 2003/0069718 A1 | 4/2003 | Hollister et al. |
| 2003/0153977 A1 | 8/2003 | Suguro et al. |
| 2003/0153981 A1 | 8/2003 | Wang et al. |
| 2003/0155686 A1 | 8/2003 | Hawkins et al. |
| 2003/0158606 A1 | 8/2003 | Coon et al. |
| 2003/0209305 A1 | 11/2003 | Smith et al. |
| 2003/0220696 A1 | 11/2003 | Levine et al. |
| 2004/0006393 A1 | 1/2004 | Burkinshaw |
| 2004/0009228 A1 | 1/2004 | Tormala et al. |
| 2004/0015170 A1 | 1/2004 | Tallarida et al. |
| 2004/0023586 A1 | 2/2004 | Tilton |
| 2004/0044414 A1 | 3/2004 | Nowakowski |
| 2004/0054416 A1 | 3/2004 | Wyss et al. |
| 2004/0059356 A1 | 3/2004 | Gingras |
| 2004/0098132 A1 | 5/2004 | Andriacchi et al. |
| 2004/0121110 A1 | 6/2004 | Schmidt et al. |
| 2004/0143339 A1 | 7/2004 | Axelson et al. |
| 2004/0148030 A1 | 7/2004 | Ek |
| 2004/0153163 A1 | 8/2004 | Posner |
| 2004/0162622 A1 | 8/2004 | Simon et al. |
| 2004/0167633 A1 | 8/2004 | Wen et al. |
| 2004/0191106 A1 | 9/2004 | O'Neill et al. |
| 2004/0199249 A1 | 10/2004 | Fell |
| 2004/0199250 A1 | 10/2004 | Fell |
| 2004/0204766 A1 | 10/2004 | Siebel |
| 2004/0230315 A1 | 11/2004 | Ek |
| 2004/0243237 A1 | 12/2004 | Unwin et al. |
| 2004/0267363 A1 | 12/2004 | Fell et al. |
| 2005/0033424 A1 | 2/2005 | Fell |
| 2005/0043816 A1 | 2/2005 | Datta et al. |
| 2005/0079200 A1 | 4/2005 | Ralhenow et al. |
| 2005/0085918 A1 | 4/2005 | Soffiati et al. |
| 2005/0100578 A1 | 5/2005 | Schmid et al. |
| 2005/0123672 A1 | 6/2005 | Justin et al. |
| 2005/0154471 A1 | 7/2005 | Aram et al. |
| 2005/0170159 A1 | 8/2005 | Ramsey et al. |
| 2005/0171604 A1 | 8/2005 | Michalow |
| 2005/0177169 A1 | 8/2005 | Fisher et al. |
| 2005/0192672 A1 | 9/2005 | Wyss et al. |
| 2006/0045903 A1 | 3/2006 | Kadiyala et al. |
| 2006/0147332 A1 | 7/2006 | Jones et al. |
| 2007/0142914 A1 | 6/2007 | Jones et al. |
| 2007/0156249 A1 | 7/2007 | Lawrynowicz et al. |
| 2007/0225390 A1 | 9/2007 | Wang et al. |
| 2008/0004709 A1 | 1/2008 | O'Neill et al. |
| 2008/0050412 A1 | 2/2008 | Jones et al. |
| 2008/0161927 A1 | 7/2008 | Savage et al. |
| 2009/0068245 A1 | 3/2009 | Noble et al. |
| 2009/0087605 A1 | 4/2009 | Ramsey et al. |
| 2010/0191345 A1* | 7/2010 | Pressacco ............ A61L 27/047 623/22.26 |
| 2011/0014081 A1 | 1/2011 | Jones et al. |

FOREIGN PATENT DOCUMENTS

| | | |
|---|---|---|
| EP | 0295038 | 12/1988 |
| EP | 0528800 | 3/1993 |
| EP | 0761242 | 3/1997 |
| EP | 1300511 | 4/2003 |
| EP | 1418013 | 5/2004 |
| EP | 1426013 | 6/2004 |
| EP | 1455666 | 9/2004 |
| EP | 1493455 | 1/2005 |
| EP | 1683593 | 7/2006 |
| EP | 1806154 | 7/2007 |
| EP | 1949989 | 7/2008 |
| JP | 2001303751 | 10/2001 |
| RU | 2218242 | 12/2003 |
| WO | 9606981 | 3/1996 |
| WO | 2005/084216 | 9/2005 |
| WO | 2005080029 | 9/2005 |
| WO | 2005087982 | 9/2005 |
| WO | 2007058160 | 5/2007 |

OTHER PUBLICATIONS

Gibson, et al., Additive Manufacturing Technologies: Rapid Prototyping to Direct Digital Manufacturing, Springer, 2010, pp. 103-142.*

* cited by examiner

FABRICATION OF HYBRID SOLID-POROUS MEDICAL IMPLANTABLE DEVICES WITH ELECTRON BEAM MELTING TECHNOLOGY

CROSS-REFERENCE TO RELATED APPLICATIONS

This application claims the benefit of U.S. Provisional Application No. 61/596,195, filed on Feb. 7, 2012, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2012-2013 Medical Modeling Inc.

BACKGROUND

1. Field

Embodiments of the present invention generally relate to implantable medical devices having porous, honey-comb like structures, and more specifically methods of constructing such devices with integrated porous technology using an Electron Beam Melting (EBM) additive manufacturing process.

2. Description of Related Art

In the implanted medical device field it is well established that coating a solid prosthesis with a porous layer promotes the ingrowth of bone into the surface of the implant. Bone ingrowth results in better adhesion between the implanted device and the adjoining bone for better short- and long-term fixation of the implant. Over the years, many different methods of manufacturing implant devices with porous coatings have been researched and developed. The research has focused, not only on methods of attaching coatings to a base or core substrate material, but also on the material and morphology of the coatings themselves. Methods that involve one or more intermediate phases between the substrate material and the coating, or several layers of the same coating have also been developed.

Many of these methods require multiple processing steps to achieve the final porous coated metallic implant. Some of these steps could include, cleaning, acid etching, plasma spraying, diffusion bonding, and sintering. Not only are most of the developed methods time consuming and expensive, but several of the methods have been shown to have negative effects on the mechanical properties of the parent substrate material. Many methods, such as diffusion bonding, thermal deposition, and sintering involve high temperature heat treatments that may decrease the performance characteristics of the initial solid prosthetic component to which the coating is applied.

As a result many of these methods aim to minimize the impact of heat treatment on the properties of the parent material, which could lead to poor adhesion between the parent material and the porous coating. A weak coating-substrate interface can lead to third body wear in joint applications, where the porous material detaches from the substrate and migrates to the joint wear surfaces creating premature wear and failure of the devices.

SUMMARY

Systems and methods are described for fabrication of implantable medical devices having porous, honeycomb like structures using an Electron Beam Melting (EBM) manufacturing process. According to one embodiment, an EBM manufacturing system is caused to perform a fabrication process that results in an implantable medical device of unitary construction having a solid volume and a porous volume. A layer of metal powder is spread across a build platform of the EBM manufacturing system. Portions of the layer of metal powder are selectively heated in accordance each portion's association with the solid volume or the porous volume by scanning the layer of metal powder with an electron beam of the EBM manufacturing system and adjusting a power of the electron beam and a speed of said scanning. The build platform is lowered based on a predetermined layer thickness and the process of continues on a layer-by-layer basis until the implantable medical device is completed.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings in which.

DETAILED DESCRIPTION

Methods are described for manufacturing an implantable prosthesis having porous, honeycomb like structures using an Electron Beam Melting (EBM) additive manufacturing process. Embodiments of the present invention seek to facilitate production of implantable medical devices e.g., orthopaedic devices, having porous structures, such as hybrid solid-porous orthopaedic devices or completely porous (porous-only) orthopaedic devices, in a single-step production. According to one embodiment, multiple or complicated secondary processing steps needed to add porous coatings to the surfaces of orthopaedic devices may be eliminated, thereby increasing the structural continuity between the volumes having different density characteristics (e.g., a porous outer surface and a solid main body or inner core). Various embodiments also avoid traditional coating processes that can be detrimental to the mechanical strength of an orthopaedic device.

According to one embodiment of the present invention, a solid, one-piece, load-bearing prosthesis is created from a metallic powder, such as titanium alloys (e.g., Ti6Al4V titanium alloy or Ti6Al4V ELI titanium alloy), Nyobium alloys and Cobalt-Chrome-Molybdenum alloy while simultaneously creating a mesh porous shell on the surface of the prosthesis. In one embodiment, the porous surface is constructed based on a predefined unit cell that is replicated to cover a defined region of the surface of the prosthesis. In this manner, the inventive method is not limited to commodity prosthetics and can be applied to complex surface geometries thereby extending applicability of the inventive method to custom prosthetics.

In one embodiment, the method is based on a computer aided design (CAD) model of the prosthesis to be generated. Using 3D design software or rapid prototypic software, such as the Magics e-Solution Suite available from Materialise of Leuven, Belgium, the geometry of the solid part is established, and the thickness and locations of the porous surface are also defined. According to one embodiment, the geometry of the solid part, which will ultimately serve as a custom prosthetic, is based on medical imaging data (e.g., produced by a computed tomography (CT) imaging system). The resulting CAD model is used to guide EBM additive metal fabrication equipment in the additive manufacturing of an actual physical part with the geometry defined by the virtual model.

According to one embodiment, regions of the virtual 3D model can be defined as either 'solid' volume or 'porous' volume, and using these definitions the EBM additive metal fabrication equipment may be directed to alter the production parameters for each respective volume to create differing structures in the defined volumes. Advantageously, various embodiments of the inventive method may produce, in one process, what typically takes other methods several processing steps to accomplish. An added advantage to various embodiments of the present invention is the elimination of high temperature coating processes and the negative effect they have on the parts mechanical performance.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Embodiments of the present invention or portions thereof may be provided as a computer program product that may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, an example of how an embodiment of the manufacturing methods of the present invention can be applied to produce a hybrid solid-porous implantable metallic device is described herein in the context of acetabular hip cups, the present invention is equally applicable to various other implantable medical devices, including, but not limited to, total joint components, bone void fillers, rigid fixation devices, spinal implants and other types of bone implants. Similarly, fully porous implants are contemplated, as well. Additionally, for sake of illustration, an embodiment of the present invention is described in the context of Electron Beam Melting (EBM). It should be apparent, however, that the methodologies described herein are broadly applicable to other additive-metal fabrication equipment and/or processes such as Selective Laser Melting (SLM), Direct Metal Laser Sintering (DMLS) or other Laser Sintering (LS) techniques which produce metal parts in an additive, layer-by-layer fashion.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be couple directly, or via one or more intermediary media or devices. As another example, devices may be coupled in such a way that information can be passed there between, while not sharing any physical connection on with another. Based on the disclosure provided herein, one of ordinary skill in the art will appreciate a variety of ways in which connection or coupling exists in accordance with the aforementioned definition.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The term "responsive" includes completely or partially responsive.

Embodiments of the present invention facilitate manufacturing of an integrated implantable medical device (e.g., an orthopaedic device) in which multiple portions or volumes (e.g., a porous outer structure and a solid main body or inner core) of a single, unified metallic part of unitary construction are manufactured during a single manufacturing step or process. This can be accomplished in several ways, two of which are: (ii) by adding a CAD designed lattice-type porous structure (based on one or more predefined unit cell structures) to the outer layer of the part and/or (ii) by defining distinct volumes within the part whereby machine parameters will be changed to affect the structure of the metallic part.

One example of an area of high demand for porous coated implantable devices is acetabular hip cups. The part needs a strong solid construction to withstand the load it experiences during service. A porous outer surface layer or structure is desirable to encourage bone ingrowth and improve adhesion to the bone. Acetabular hip cups, made out of Ti6Al4V—ELI or standard Ti6Al4V materials, can be manufactured using additive-metal fabrication equipment with processes such as Electron Beam Melting (EBM), Direct Metal Laser Sintering (DMLS), Selective Laser Melting (SLM) or other Laser Sintering (LS) techniques which produce metal parts in an additive, layer by layer fashion.

EBM technology is used for purposes of the present example. EBM metal fabrication is an additive manufacturing technique utilizing an electron beam to melt metal powder into to a fully solid part, layer by layer. Like many rapid prototyping and manufacturing processes, EBM processing is able to create components with complex geometries from a digital CAD model. Unlike other metal rapid prototyping methods, which rely on high temperature sintering, the EBM process is capable of producing fully dense parts, or parts with total or partial porosity/lattice structure.

In the present example, the EBM process starts by distributing a 100 µm layer of fine metal powder on a steel platform. An electron beam scans areas as defined by the computer model, fully melting the powder in the areas scanned, after which the steel platform is lowered by 100 µm, and a new layer of powder is distributed on top of the previously melted layer. This process continues, layer by layer, until a complete part is produced.

In the example of the acetabular hip cup, the main body of the cup is defined as a solid volume. As the electron beam scans the areas of the main body of the cup, it will impart enough energy to fully melt the metal powder, resulting in a fully solid structure. The outer layer is defined as a porous volume. As the electron beam scans the outer layer, a recurring mesh or lattice solid structure can be defined in the 3D virtual model of the outer layer. This approach defines the entire virtual model as a solid structure; however, the outer layer of the model is designed as a solid mesh or lattice structure having a pore density of approximately between 40-75% resulting in single-piece implantable device having an integrated porous honey-comb like surface structure. FIGS. 1-4 demonstrate this concept.

Figure 1:
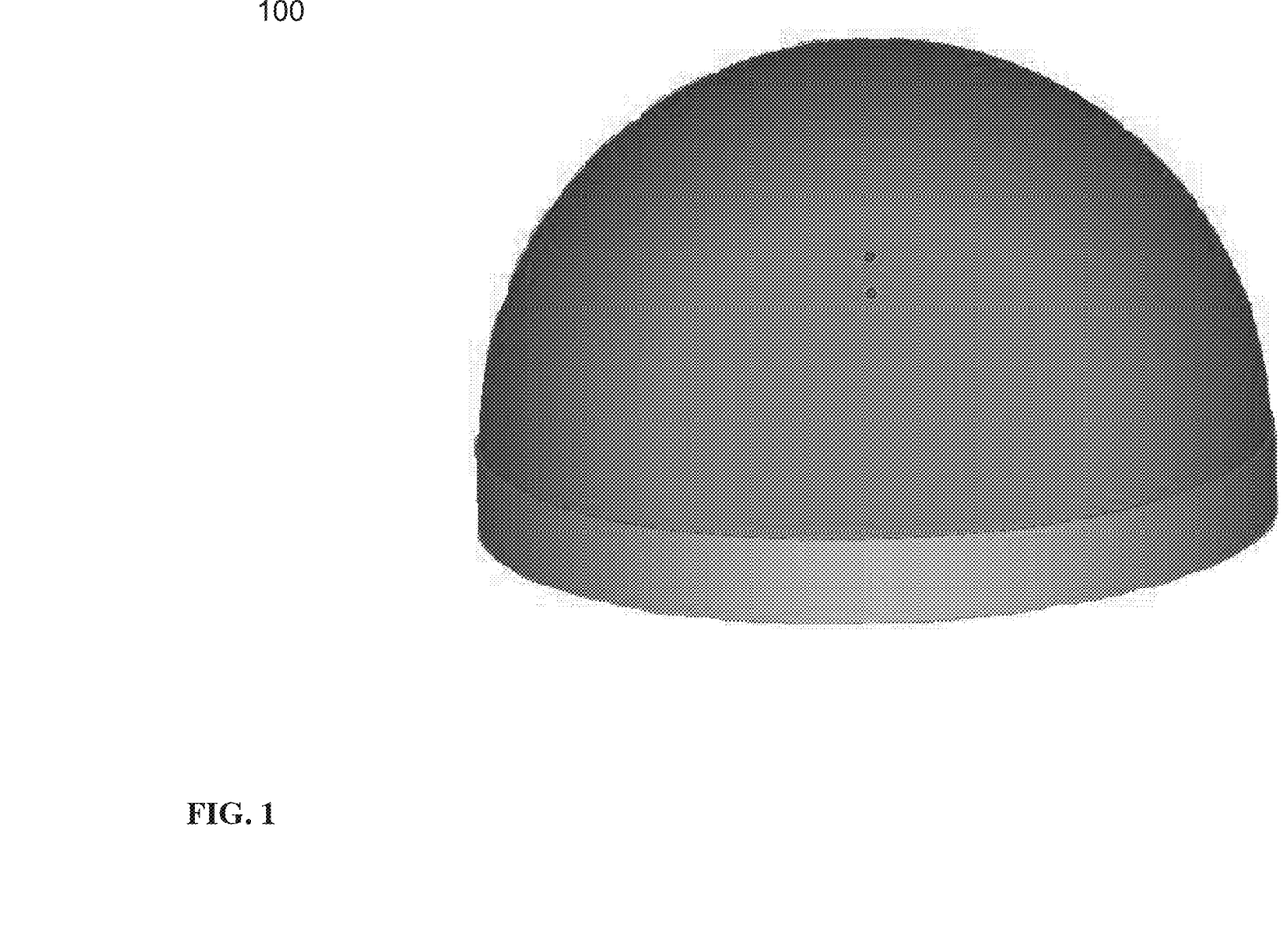
FIG. 1 is an isotropic view of an example CAD model of an acetabular hip cup designed using 3D design software in accordance with an embodiment of the present invention. The virtual part contains two distinct regions; a solid region on the inside and a porous region on the surface, or outside.

FIG. 1 is an isotropic view of an example CAD model of an acetabular hip cup 100 designed using 3D design software in accordance with an embodiment of the present invention. The virtual part 100 contains two distinct regions; a solid region on the inside and a porous region on the surface, or outside.

Figure 2:
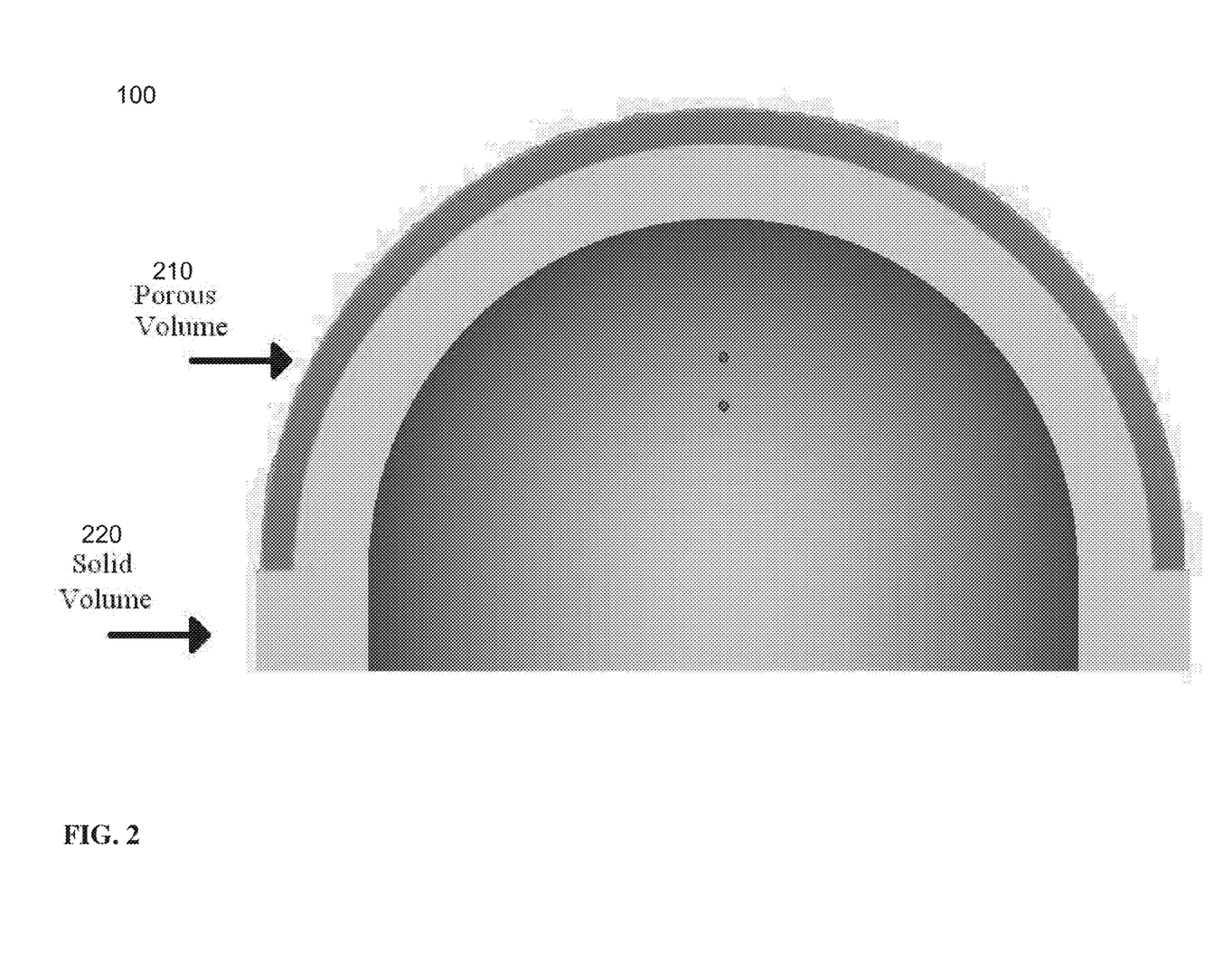
FIG. 2 is a cross-sectional view of the CAD model shown in FIG. 1. This figure better demonstrates the two distinct solid and porous regions of the single, unified part.

FIG. 2 is a cross-sectional view of the CAD model shown in FIG. 1. This figure better demonstrates the two distinct solid 210 and porous 220 regions of the single, unified part 100.

Figure 3:
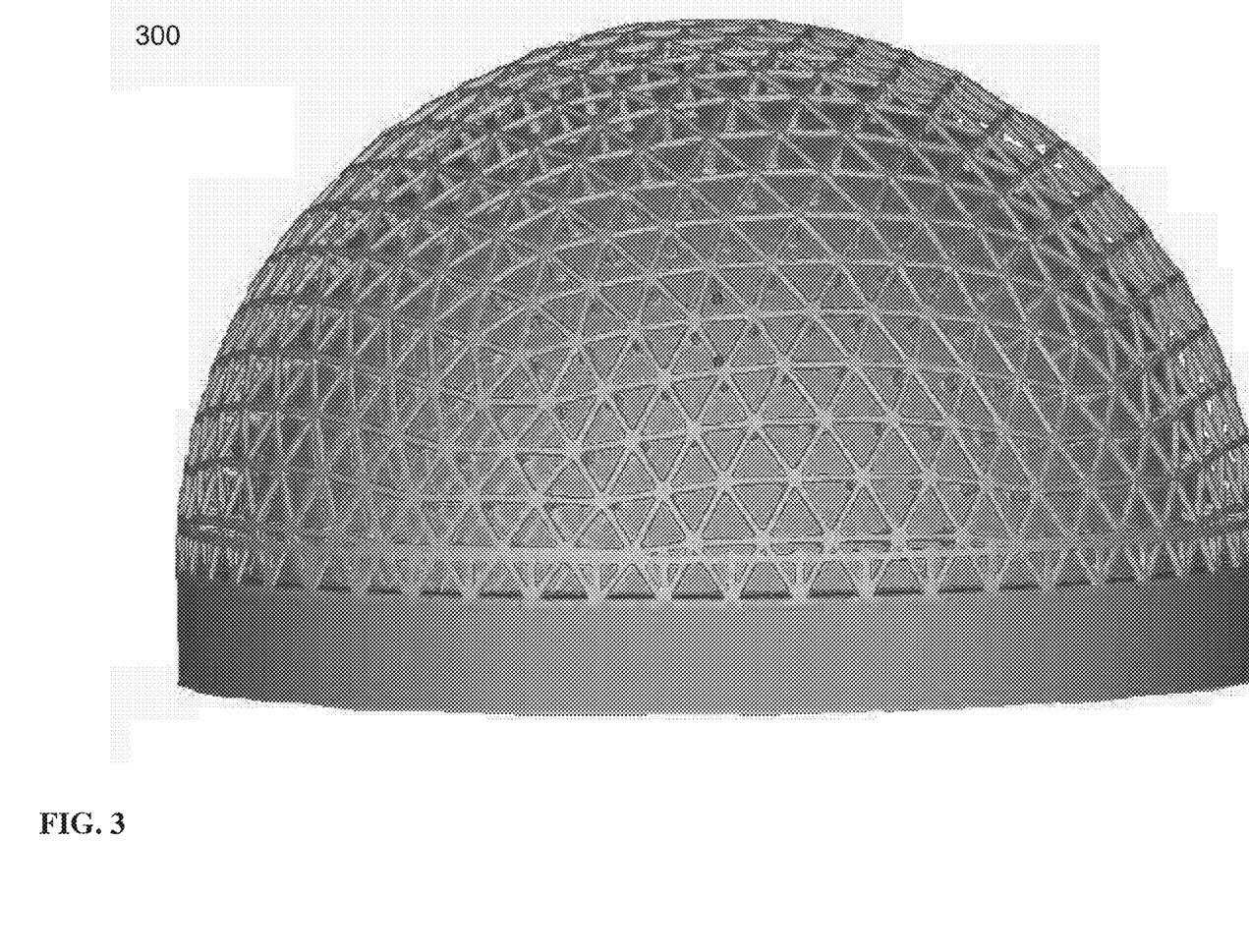
FIG. 3 is an isotropic view of a CAD model of an acetabular hip cup having a porous outer layer resulting from a repeating lattice type structure designed using 3D design software in accordance with an embodiment of the present invention.

FIG. 3 is an isotropic view of a CAD model of an acetabular hip cup 300 having a porous outer layer resulting from a repeating lattice type structure designed using 3D design software in accordance with an embodiment of the present invention.

Figure 4:
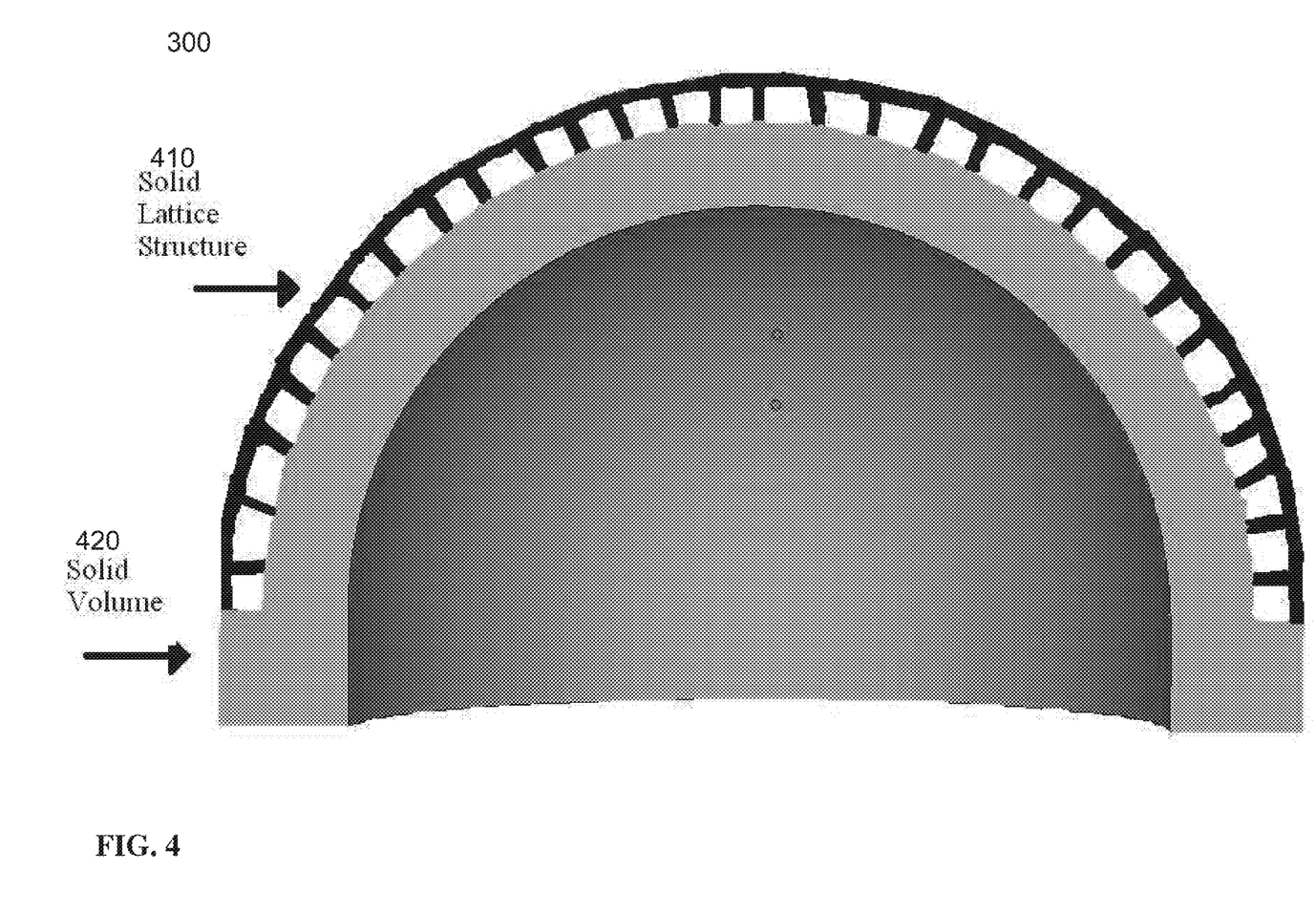
FIG. 4 is a cross-sectional view of the virtual part shown in FIG. 3. This figure better demonstrates the solid inner structure, as well as the designed lattice structures' outer layer.

FIG. 4 is a cross-sectional view of the virtual part 300 shown in FIG. 3. This figure better demonstrates the solid inner structure 420, as well as the designed lattice structures' outer layer 410.

Figure 5A:
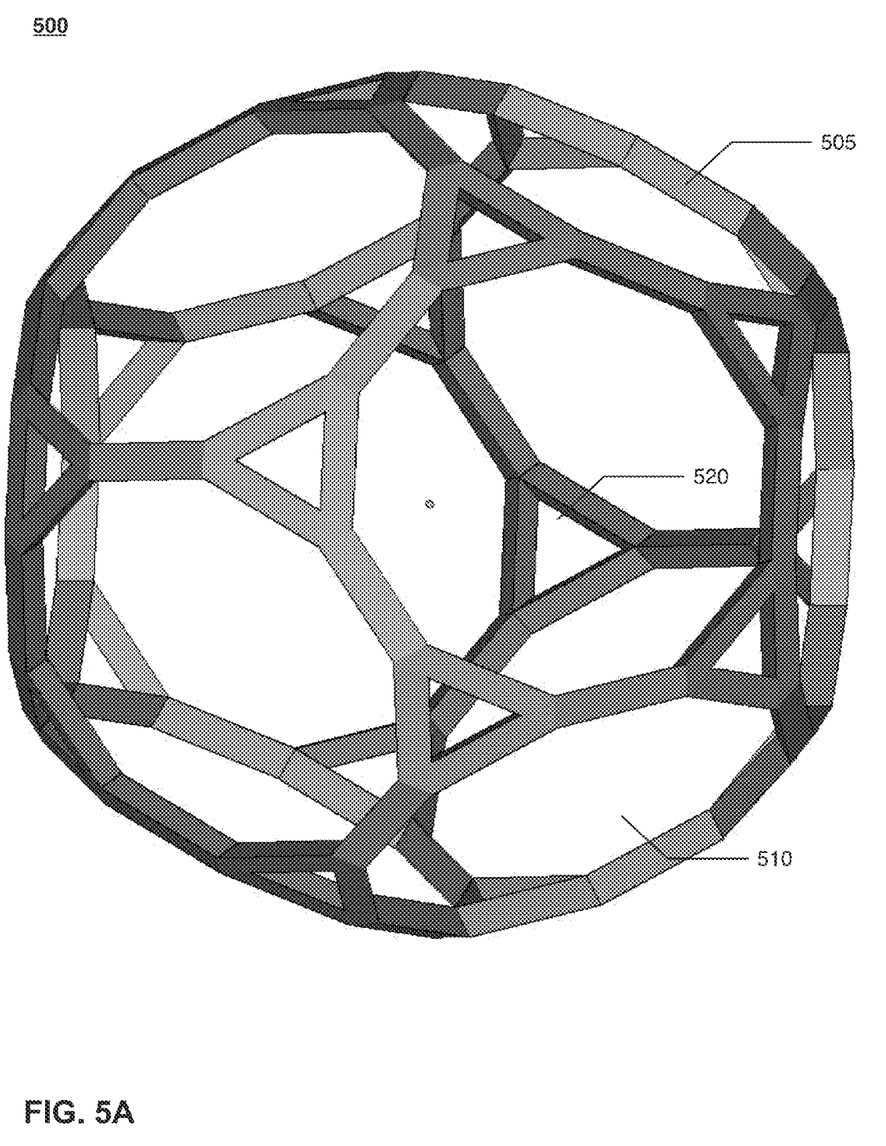
FIG. 5A depicts a non-limiting example of a unit cell that may form the lattice type structure of FIGS. 3 and 4 by replicating the unit cell structures and applying them to simple or complex surface geometries of porous coated implantable devices in accordance with embodiments of the present invention.

FIG. 5A depicts a non-limiting example of a unit cell 500 that may form the lattice type structure of FIGS. 3 and 4 by replicating the unit cell structures and applying them to simple or complex surface geometries of porous coated implantable devices in accordance with embodiments of the present invention.

Figure 5B:
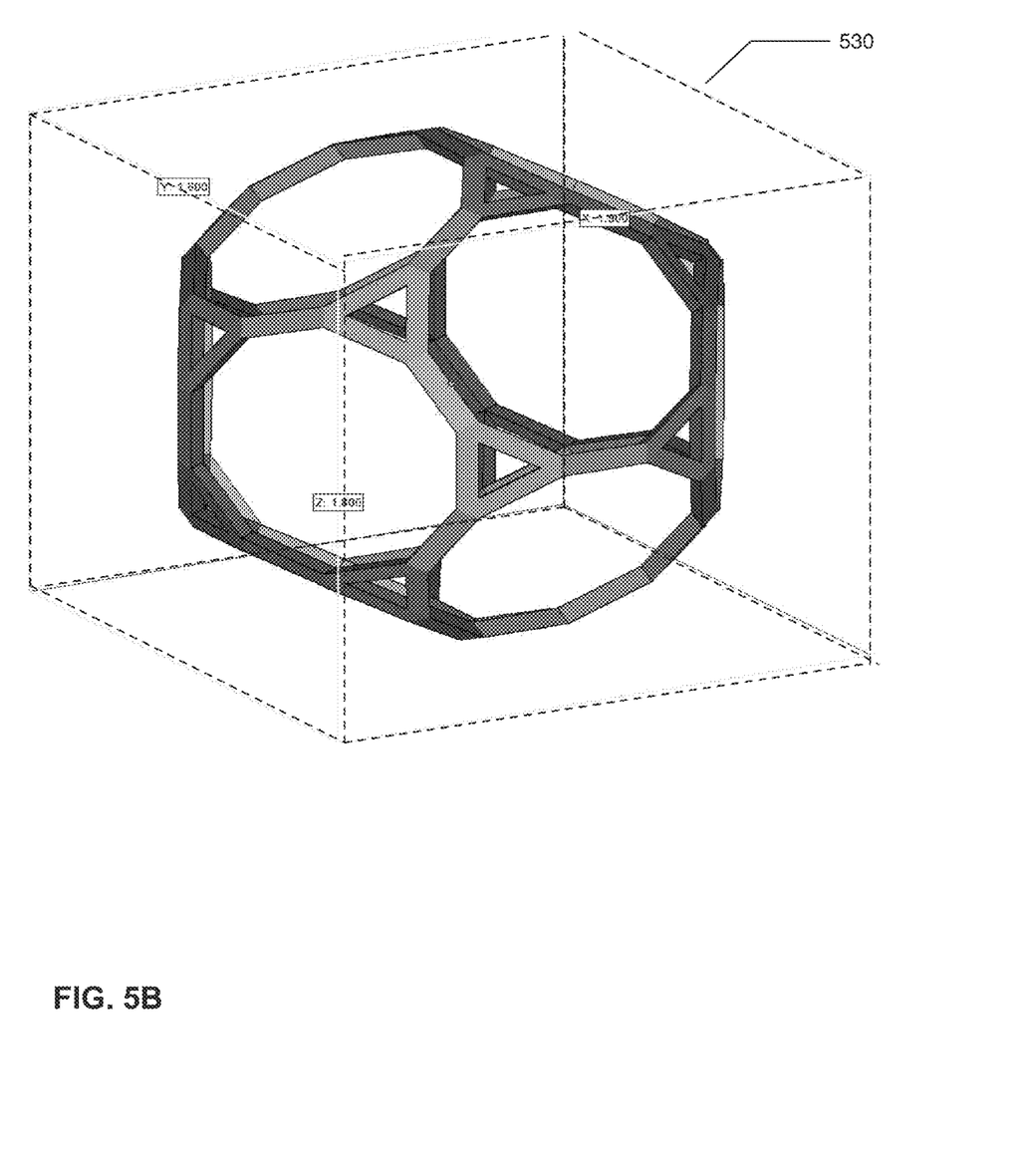
FIG. 5B depicts a unit cell within a cube to illustrate its size in accordance with an embodiment of the present invention.

FIG. 5B depicts a unit cell within a 1.8 mm×1.8 mm×1.8 mm cube 530 to illustrate its size in accordance with an embodiment of the present invention.

Figure 5C:
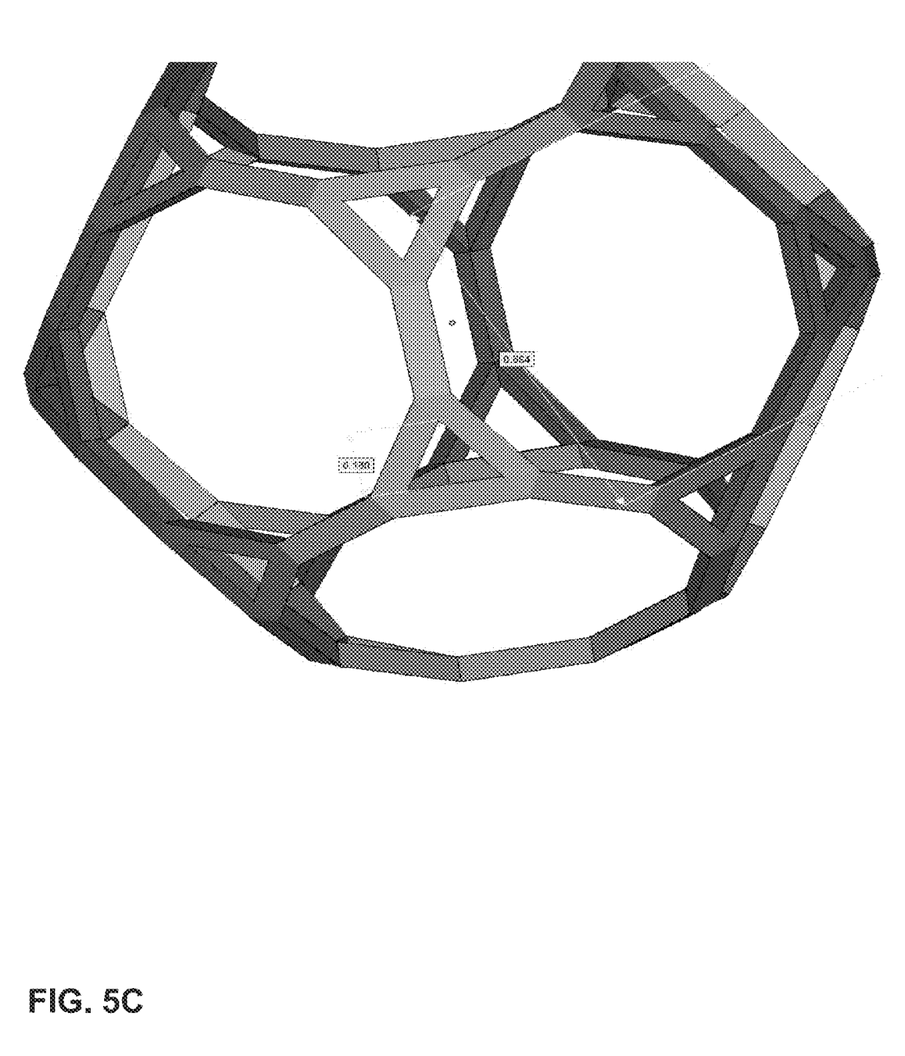
FIG. 5C depicts a portion of a unit cell with dimensions identified for two different types of pores in accordance with an embodiment of the present invention.

FIG. 5C depicts a portion of a unit cell with dimensions identified for two different types of pores in accordance with an embodiment of the present invention. In the present example, the triangular pore has a height of 0.18 mm and the decagonal pore has a height of 0.864 mm.

Figure 5D:
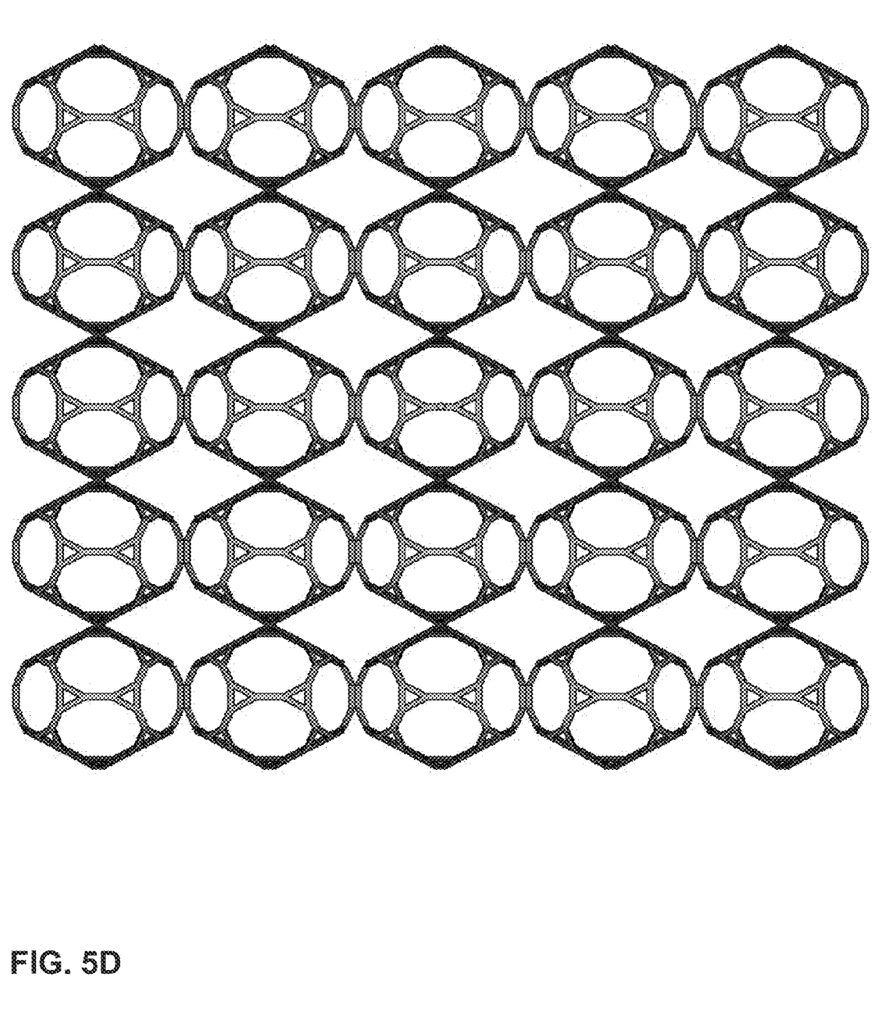
FIG. 5D is a front view of a 5×5×5 cube formed from replication of a unit cell in accordance with an embodiment of the present invention.

FIG. 5D is a front view of a 5×5×5 cube formed from replication of a unit cell in accordance with an embodiment of the present invention.

Figure 5E:
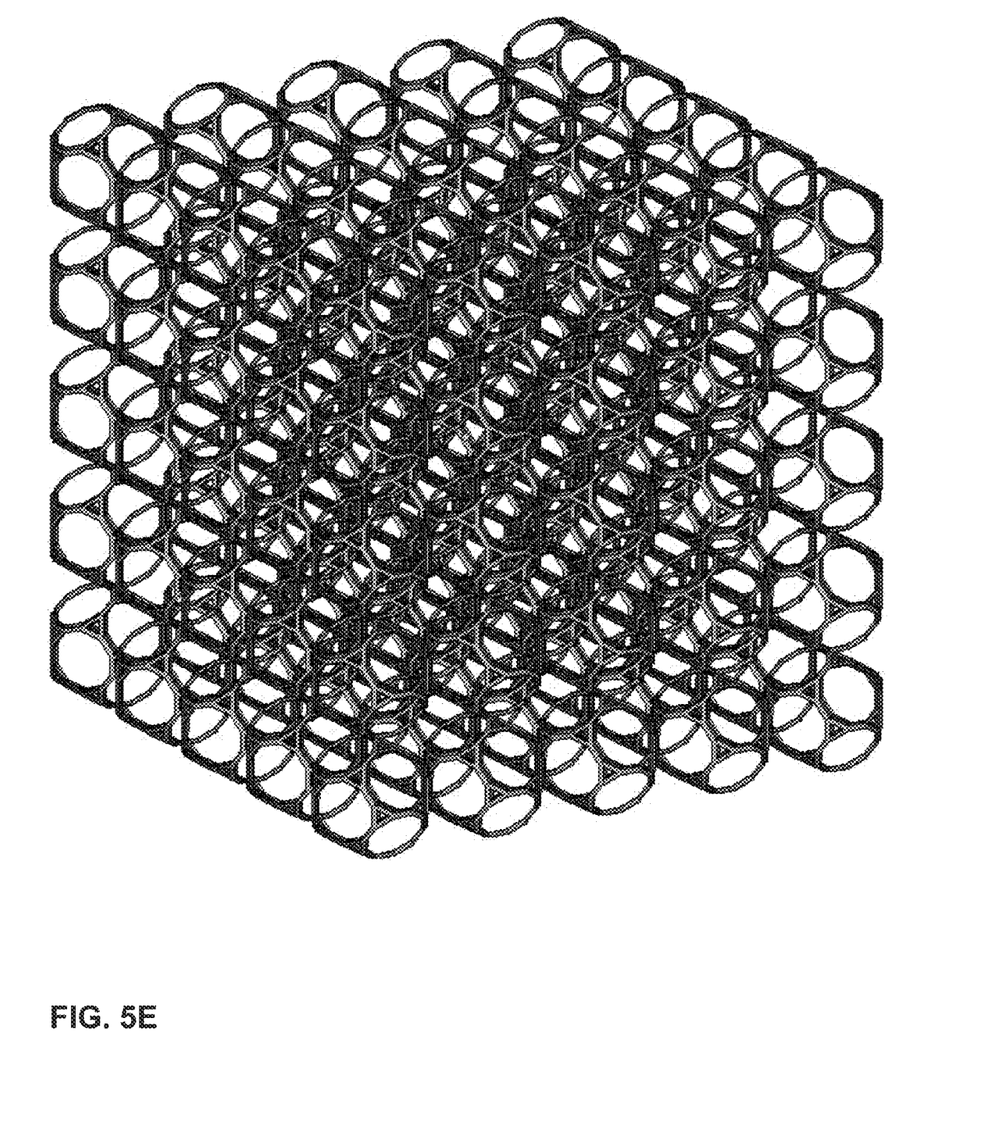
FIG. 5E is an isotropic view of a 5×5×5 cube formed from replication of a unit cell in accordance with an embodiment of the present invention.

FIG. 5E is an isotropic view of a 5×5×5 cube formed from replication of a unit cell in accordance with an embodiment of the present invention.

According to one embodiment, porous structures can be created by essentially replicating a predefined unit cell over an arbitrary geometry in a predefined layer thickness. In one embodiment, a best fit container (e.g., a rectangular prism or cube) is first defined that encompasses the 3D virtual model of the prosthesis to be generated. Then, the rapid prototyping software is directed to fill those portions of the container from which the defined surface layer of the prosthesis will be formed by replicating a unit cell structure (an example of which is depicted in FIG. 5A). As such, when the 3D virtual model of the prosthesis is extracted from the container a recurring mesh or honey-comb porous layer is created on the outer layer of the 3D virtual model. This approach defines the entire virtual model as a solid structure; however, the outer layer of the model is designed as a porous mesh or lattice structure having a density of approximately between 40% to 75%. FIG. 3 and FIG. 4 demonstrate a simplified example of this concept. During production of a part designed in this manner, the electron beam may fully melt the metallic powder particles in the areas defined as solid in the virtual model and may only partially melt the metallic powder particles in the areas defined as porous, resulting in an outer surface layer that has the defined mesh of lattice structure.

According to one embodiment, to create a fully dense part, the electron beam imparts enough energy into the metal powder to fully melt all of the metallic powder particles. The energy that the electron beam will impart into the powder is a function of the scan speed and power of the electron beam. In some embodiments, in addition to or instead of creating the unit cell structures, higher scan speeds or lower power electron beams can be used to produce partially melted metallic powder, which is one way of creating a random sintered structure. By defining individual regions within a part, it is possible to set the scan speed and/or beam power to values that will create the desired structure within each defined region.

FIG. 5A depicts a non-limiting example of a unit cell structure that may be replicated and applied to simple or complex surface geometries of porous coated implantable devices, such as acetabular hip cups, according to an embodiment of the present invention.

According to one embodiment, a surface layer thickness of between 0.030 mm and 0.10 mm is thought to create an optimal osteoconductive surface for an acetabular hip cup.

In one embodiment, the unit cell structure fits within a cube having edge lengths of between 1.2 mm and 4.2 mm and is represented by a number of pores (e.g., 510 and 520) and struts (e.g., 505) in which the pores have a diameter of approximately between 0.200 mm and 3.00 mm and the struts have a thickness of approximately between 0.100 mm and 1.00 mm. According to one embodiment, use of the EBM metal fabrication process facilitates adjustment of pore diameter and/or strut thickness by tuning one or both of two parameters (i.e., electron beam scan speed and electron beam power).

Exemplary Computer System Overview

Figure 6:
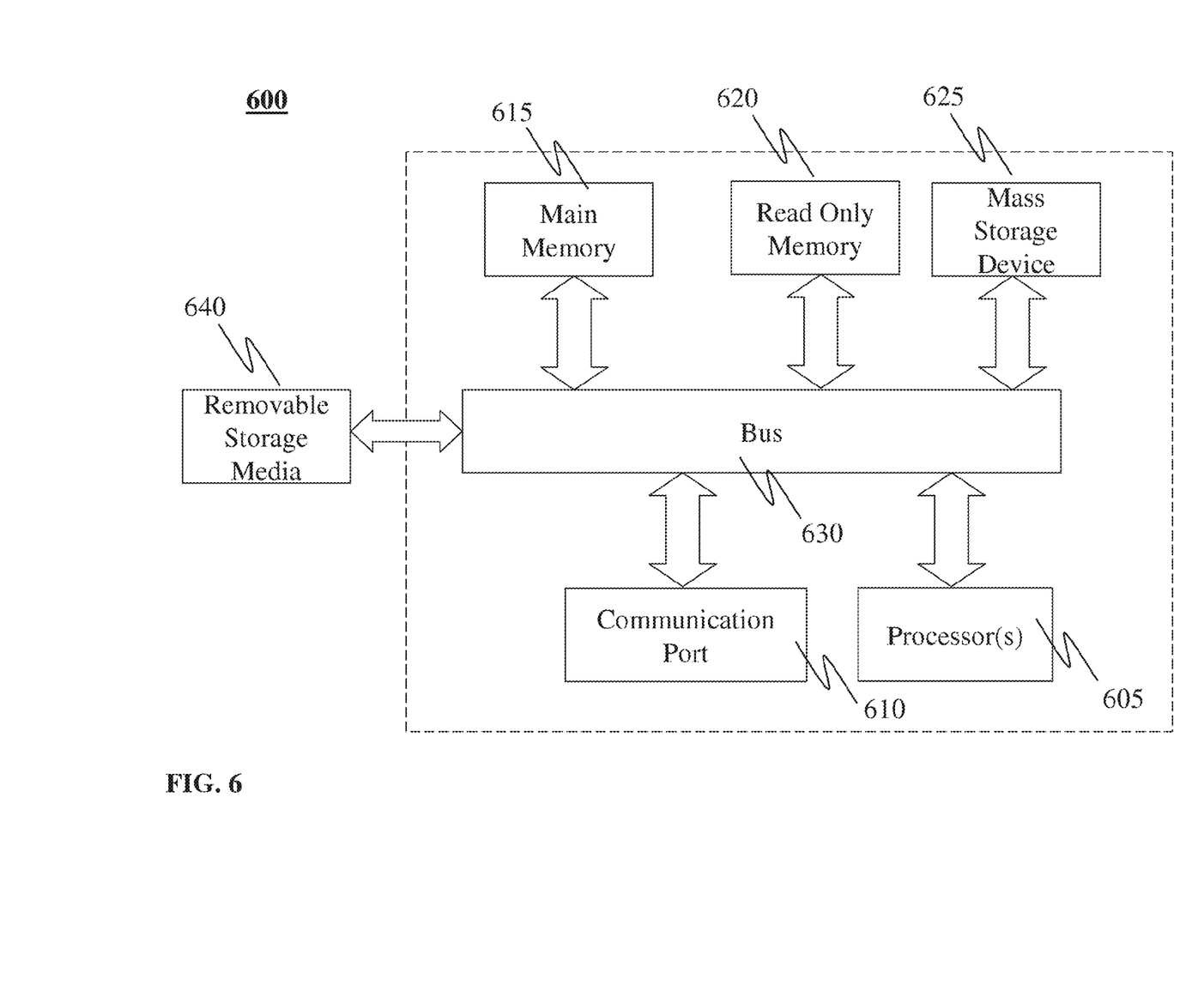
FIG. 6 is an example of a computer system with which embodiments of the present invention may be utilized.

Embodiments of the present invention include various steps, which have been described above. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 6 is an example of a computer system 600, such as a workstation, personal computer, work station or server, upon which or with which embodiments of the present invention may be utilized. According to one embodiment, computer system 600 runs 3D design software or rapid prototypic software, which can be used to design a virtual model of an implantable medical device and output the resulting virtual model (e.g., a 3D CAD model in a stereolithography or Standard Tessellation Language (STL) format) to the EBM machine. The EBM machine may perform additional processing of the STL formatted model (e.g., slicing the model into 2D layers).

According to the present example, the computer system includes a bus 630, at least one processor 605, at least one communication port 610, a main memory 615, a removable storage media 640 a read only memory 620, and a mass storage 625.

Processor(s) 605 can be any known processor, such as, but not limited to, an Intel® Itanium® or Itanium 2 processor(s), or AMD® Opteron® or Athlon MP® processor(s), or Motorola® lines of processors. Communication port(s) 610 can be any of an RS-232 port for use with a modem based dialup connection, a 10/100 Ethernet port, or a Gigabit port using copper or fiber. Communication port(s) 610 may be chosen depending on a network such a Local Area Network (LAN), Wide Area Network (WAN), or any network to which the computer system 600 connects.

Main memory 615 can be Random Access Memory (RAM), or any other dynamic storage device(s) commonly known in the art. Read only memory 620 can be any static storage device(s) such as Programmable Read Only Memory (PROM) chips for storing static information such as instructions for processor 605.

Mass storage 625 can be used to store information and instructions. For example, hard disks such as the Adaptec® family of SCSI drives, an optical disc, an array of disks such as RAID, such as the Adaptec family of RAID drives, or any other mass storage devices may be used.

Bus 630 communicatively couples processor(s) 605 with the other memory, storage and communication blocks. Bus 630 can be a PCI/PCI-X or SCSI based system bus depending on the storage devices used.

Optionally, operator and administrative interfaces 635, such as a display, keyboard, and a cursor control device, may also be coupled to bus 630 to support direct operator interaction with computer system 600. Other operator and administrative interfaces can be provided through network connections connected through communication ports 610.

Removable storage media 640 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

Figure 7A:
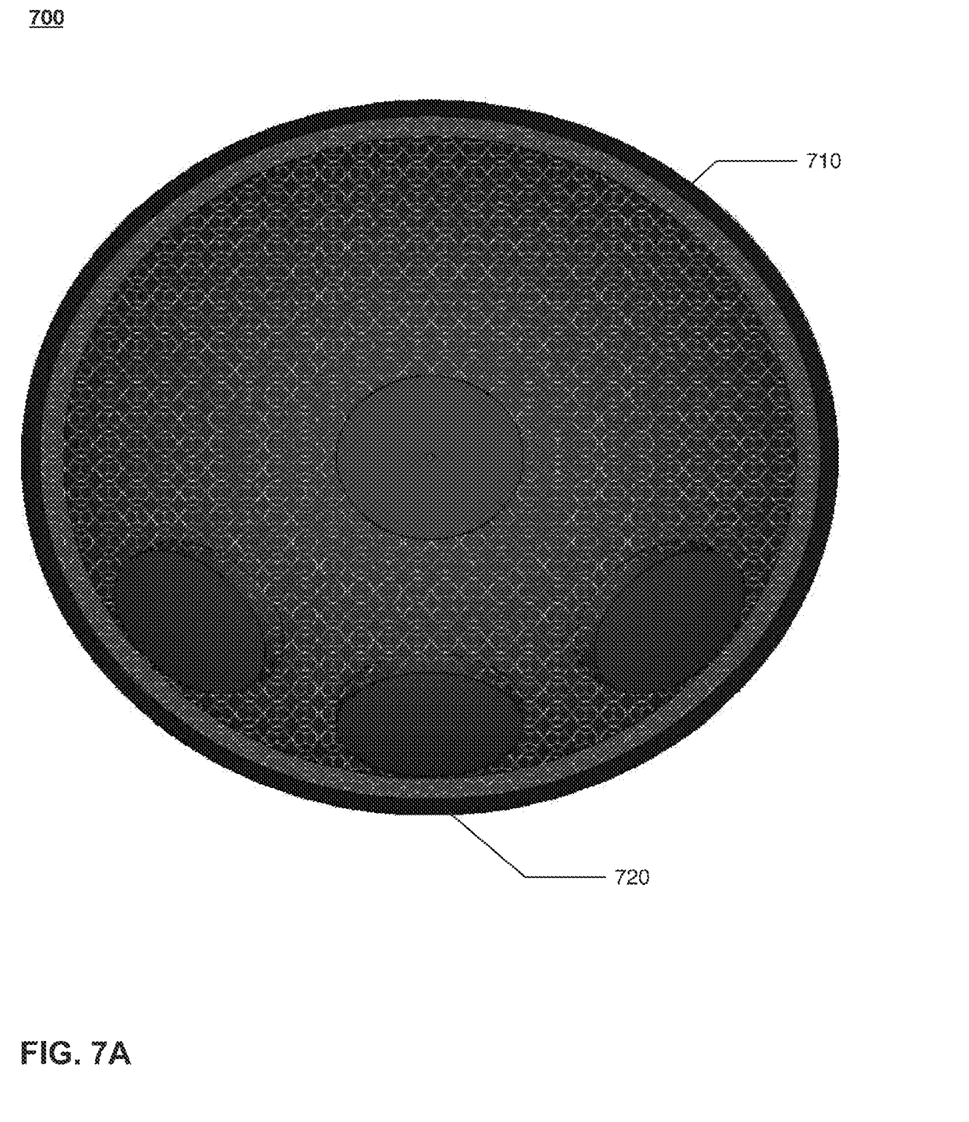
FIG. 7A is a top view of an acetabular hip cup having a surface layer formed from replication of a unit cell in accordance with an embodiment of the present invention.

FIG. 7A is a top view of an acetabular hip cup 700 having a surface layer 710 formed from replication of a unit cell in accordance with an embodiment of the present invention. Solid portions, such as main body 720 may be formed during the same single-step production as the surface layer 710, but using a higher electron beam power and/or slower scanning speed to fully melt the metal powder to create a solid portion.

Figure 7B:
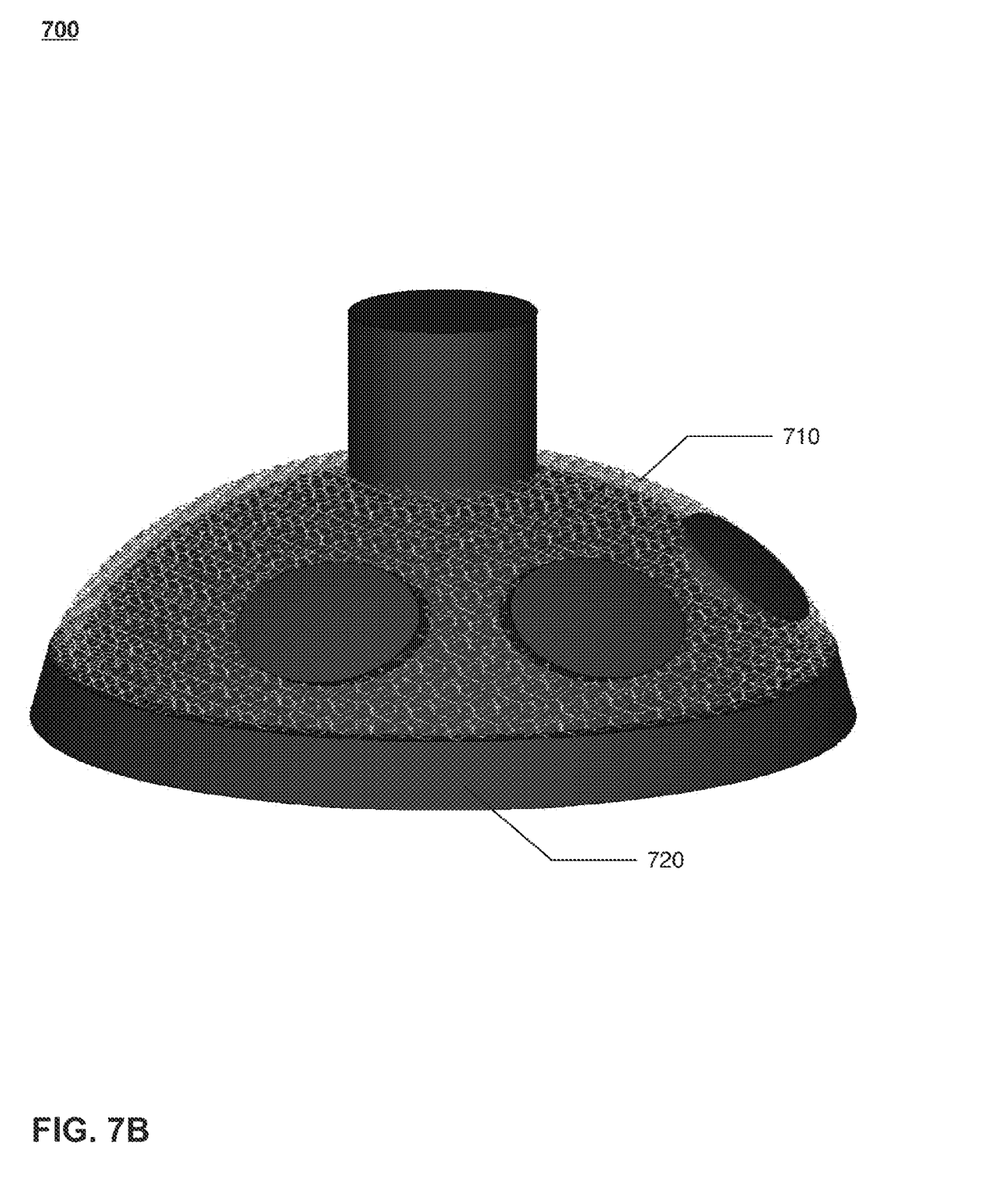
FIG. 7B is an isotropic view of an acetabular hip cup having a surface layer formed from replication of a unit cell in accordance with an embodiment of the present invention.

FIG. 7B is an isotropic view of an acetabular hip cup 700 having a surface layer 710 formed from replication of a unit cell in accordance with an embodiment of the present invention.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
   causing an Electron Beam Melting (EBM) manufacturing system to perform a fabrication process that results in an implantable medical device of unitary construction having a solid volume and a porous volume and wherein the fabrication process comprises carrying out the following steps on a layer-by-layer basis:
   spreading a layer of metal powder across a build platform of the EBM manufacturing system;
   selectively heating a plurality of portions of the layer of metal powder in accordance each portion's association with the solid volume or the porous volume by scanning the layer of metal powder with an electron beam of the EBM manufacturing system and adjusting a power of the electron beam and a speed of said scanning;
   lowering the build platform based on a predetermined layer thickness;
   wherein the solid volume comprises a main body of the implantable medical device and wherein the porous volume comprises an outer layer of the implantable medical device to encourage bone ingrowth after implantation;
   wherein the porous volume comprises a replicated pattern of a predefined unit cell structure;
   wherein the predefined unit cell structure includes a plurality of pores formed by a plurality of interconnected struts; and
   wherein the plurality of pores include triangle-shaped pores and decagon-shaped pores.

2. The method of claim 1, wherein the implantable medical device comprises an acetabular hip cup.

3. The method of claim 1, wherein the metal powder comprises Ti6A14V titanium alloy or Ti6A14V ELI titanium alloy.

4. The method of claim 1, wherein the predefined unit cell structure fits within a cube having edge lengths of between 1.2 mm and 4.2 mm.

5. The method of claim 4, wherein the plurality of pores each have a diameter of approximately between 0.200 mm and 3.00 mm and the plurality of struts have a thickness of approximately between 0.100 mm and 1.00 mm.

6. The method of claim 5, further comprising adjusting the diameter or the thickness by tuning one or both of the power of the electron beam and the speed of said scanning.

7. The method of claim 1, wherein the triangle-shaped pores comprise equilateral triangles and wherein the decagon-shaped pores comprise regular decagons.

8. The method of claim 7, wherein each of the equilateral triangles is adjacent to three regular decagons and each of the regular decagons is adjacent to five equilateral triangles and five regular decagons.

9. A method comprising:

causing an Electron Beam Melting (EBM) manufacturing system to perform a fabrication process that results in a fully porous implantable medical device of unitary construction, wherein the fabrication process comprises carrying out the following steps on a layer-by-layer basis:

spreading a layer of metal powder across a build platform of the EBM manufacturing system;

selectively heating a plurality of portions of the layer of metal powder to form a subset of a porous structure represented by a replicated pattern of a predefined unit cell;

lowering the build platform based on a predetermined layer thickness;

wherein the predefined unit cell includes a plurality of pores formed by a plurality of interconnected struts;

wherein the selectively heating includes scanning the layer of metal powder with an electron beam of the EBM manufacturing system and adjusting a power of the electron beam and a speed of said scanning in accordance with diameters of the plurality of pores and a thicknesses of the plurality of interconnected struts; and wherein the plurality of pores include triangle-shaped pores and decagon-shaped pores.

10. The method of claim 9, wherein the metal powder comprises Ti6A14V titanium alloy or Ti6A14V ELI titanium alloy.

11. The method of claim 9, wherein the predefined unit cell fits within a cube having edge lengths of between 1.2 mm and 4.2 mm and is represented by a plurality of pores formed by a plurality of interconnected struts.

12. The method of claim 11, wherein the diameters are approximately between 0.200 mm and 3.00 mm and the thicknesses are approximately between 0.100 mm and 1.00 mm.

13. The method of claim 9, wherein the triangle-shaped pores comprise equilateral triangles and wherein the decagon-shaped pores comprise regular decagons.

14. The method of claim 13, wherein each of the equilateral triangles is adjacent to three regular decagons and each of the regular decagons is adjacent to five equilateral triangles and five regular decagons.

\* \* \* \* \*